United States Patent [19]

Stadler

[11] 4,069,835
[45] Jan. 24, 1978

[54] FUEL AND LUBRICANT MIXER

[76] Inventor: Rigo Stadler, 65 Hillside Ave., New York, N.Y. 10040

[21] Appl. No.: 707,393

[22] Filed: July 21, 1976

[51] Int. Cl.² ......................................... G05D 11/00
[52] U.S. Cl. ..................... 137/114; 137/98; 137/499; 222/57
[58] Field of Search ................ 137/98, 114, 499, 571, 137/576; 222/57; 123/73 AD, 196 R, 196 M

[56] References Cited

U.S. PATENT DOCUMENTS

| | | | |
|---|---|---|---|
| 1,948,034 | 2/1934 | Handy | 123/196 M |
| 2,172,951 | 9/1939 | Barclay et al. | 137/98 |
| 2,908,289 | 10/1959 | Everett | 137/576 |
| 2,935,057 | 5/1960 | Perlewitz | 123/73 AD |
| 2,945,509 | 7/1960 | Tuttle | 137/576 |
| 3,316,933 | 5/1967 | Ajero | 137/576 |
| 3,467,280 | 9/1969 | Cyphert | 222/57 |
| 3,685,530 | 8/1972 | Bailey | 137/98 |
| 3,720,231 | 3/1973 | Ajero | 137/576 |

FOREIGN PATENT DOCUMENTS

| | | | |
|---|---|---|---|
| 582,670 | 9/1959 | Canada | 137/98 |
| 1,095,691 | 12/1960 | Germany | 123/73 AD |
| 641,921 | 8/1950 | United Kingdom | 137/98 |

Primary Examiner—William R. Cline
Assistant Examiner—H. Jay Spiegel
Attorney, Agent, or Firm—James J. Cannon, Jr.; James J. Cannon

[57] ABSTRACT

A device to proportionately mix fuel and lubricant for use in a two cycle engine which has no internal mixing device incorporated therewith comprising a cylindrical lubricant container, a columnar fuel delivery inlet which perpendicularly angles to merge with and to feed fuel into a conical funneled mixing chamber immediately below the base of the lubricant supply container. An axially secured butterfly lever in the line of fuel inlet travel is depressed by passing fuel and activates a spring-loaded piston valve which allows a proportionate flow of lubricant to the mixing chamber.

3 Claims, 3 Drawing Figures

4,069,835

FUEL AND LUBRICANT MIXER

BACKGROUND OF THE INVENTION

The present invention relates to fuel and lubricant mixing devices, the mixture being required for the operation of two cycle engines, to provide means to achieve a proportionately mixed combustable fuel supply mixture within the fuel supply tank reservoir upon addition of fuel to the tank.

DESCRIPTION OF THE PRIOR ART

The prior art is replete with devices for the proportional mixing of two different fluids, primarily fuel and lubricant for the operation of an internal combustion two cycle engine. Most mixing devices are incorporated into the engine itself to receive fuel and lubricant from separate supply means, usually by suction, to be mixed in a chamber prior to entering the engine for combustion. To reduce the cost of manufacture and to reduce potential maintenance of the mixing device, manufacturers simply eliminate the mixing device and direct the addition of lubricant to the fuel supply tank for engines in which the exact mixture is not extremely critical to proper operation. The problem which then evolves is the attainment of the proper ratio of fuel and lubricant and the attainment of a uniform mixture.

The present invention is designed to proportionately mix the lubricant thoroughly with the fuel as the fuel is added to the fuel storage tank. The inventor knows of no such similar device. The device of the present invention is simple in construction, moderate in cost and reliable in service to achieve the desired lubricant-fuel mixture.

SUMMARY OF THE INVENTION

The present invention is embodied to produce a desired proportionate fuel-lubricant mixture in a fuel storage tank for two cycles engines which have no internal mixing devices incorporated therein. The present mixing device is designed to seat partially within the fuel inlet of the fuel storage tank and to accept a fuel hose delivery valve nozzle.

Briefly, the present invention provides a cylindrical lubrication container supply of approximately one quart capacity. Longitudinally abutting the lubrication container is a columnar fuel inlet which perpendicularly angles to feed fuel to a conical mixing chamber beneath the lubricant supply container. The base of the lubricant supply container has a spring-loaded piston valve therethrough which controls oil flow to the mixing chamber. The piston is attached to and activated by an axially secured spoon-like butterfly lever which extends into the columnar fuel inlet. The weight and flow of the fuel serves to push down the butterfly lever and open the piston valve to permit a proportionate flow of oil into the conical-funnel mixing chamber. The flow of the fuel and the contour of the conical mixing chamber causes agitation of the fuel and lubricant to create a fairly thorough mixture for immediate delivery to the fuel tank through the mixing chamber funnel neck.

Further features and advantages will become apparent from the following drawings and description thereof.

DESCRIPTION OF THE DRAWINGS

Figure 1:
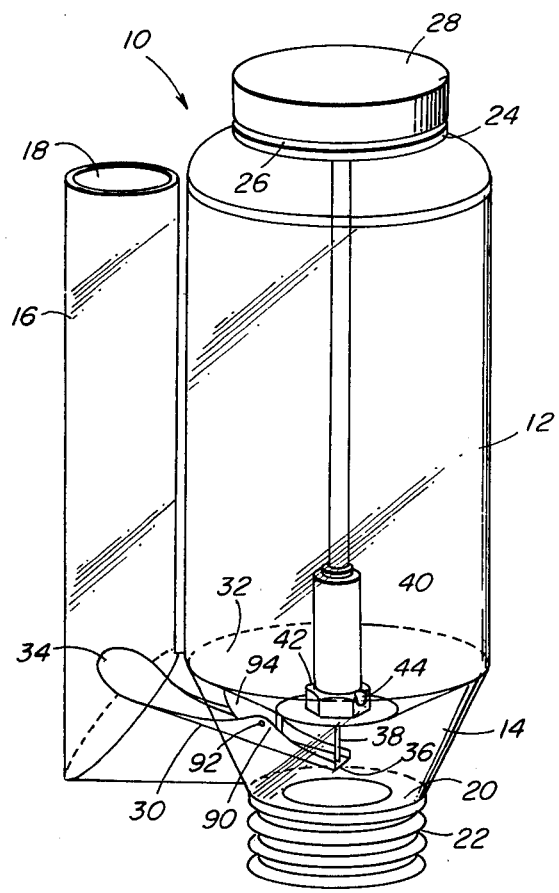
FIG. 1 illustrates a perspective view of the proportional fuel-lubrication mixing device of the present invention.

Referring now to the drawings and in particular to FIG. 1, the fuel and lubrication mixing device of the present invention is generally designated by reference numeral 10. Mixer 10 is embodied to proportionately mix the aforementioned fluids prior to addition to a fuel storage tank having delivery means to an internal combustion two-cycle engine.

Lubricant container 12, which has a substantially cylindrical configuration, provides storage for a supply of lubricant to be mixed in a definite proportion to fuel entering conical mixing chamber 14 situated immediately beneath lubricant container 12. Fuel enters mixing chamber 14 through hollow columnar inlet pipe 16 which vertically abuts and is appropriately secured to lubricant container 12 and which perpendicularly angles to merge with mixing chamber 14 at the base of container 12.

Since, mixer 10 is embodied to mix fuel and lubricant simultaneously upon the addition of the fuel to the storage tank, fuel entrance aperture 18 and the diameter of mixer fuel inlet pipe 16 are of a size capable of receiving a standard fuel hose delivery valve nozzle. Mixing chamber 14, being essentially a conical funnel, has a funnel neck base 20 having dimensions complimentary to the size of a standard fuel storage tank opening. An appropriate threaded ring 22 may be secured about the funnel neck 20 of chamber 14 to facilitate the securing of mixing device 10 to a fuel tank to assure stability when filling the tank. The upper extent of lubricant supply container has an opening to make provision for the addition of lubricant as defined by neck 24 to which is secured a threaded ring 26 which makes provision for threaded cap 28 to be twistably secured thereto.

Contoured and spoon-shaped butterfly lever member 30, axially secured to the bottom of base 32 of lubricant container 12, has a wide spoon-like curved end 34, contoured so that its edges extend angularly outwards and upwards, which extends into the bottom of the vertical portion of fuel inlet pipe 16. Contoured and curved butterfly lever end 34 occupies substantially the entire diameter of inlet pipe 16 but has sufficient clearance distance to move within inlet pipe without obstruction. Fuel traveling down inlet pipe 16 will depress curved butterfly lever end 34 and cause the opposing squared butterfly lever end 36 to move needle pin 38 of spring loaded piston 40 upwards thereby activating piston 40 and the lubricant flow through apertures 42 and 44 into mixing chamber 14.

Figure 3:
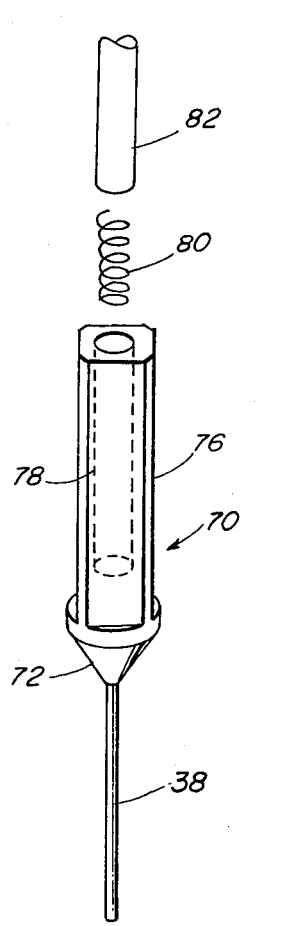
FIG. 3 is an exploded view of the spring-loaded valve mechanism of the mixer of FIGS. 1 and 2.
Figure 3:
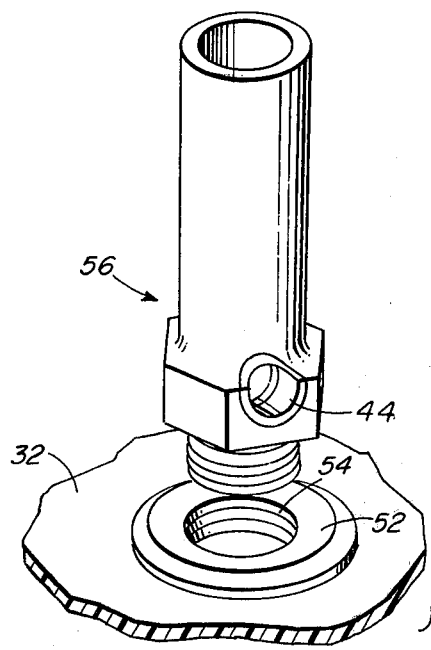
Figure 2:
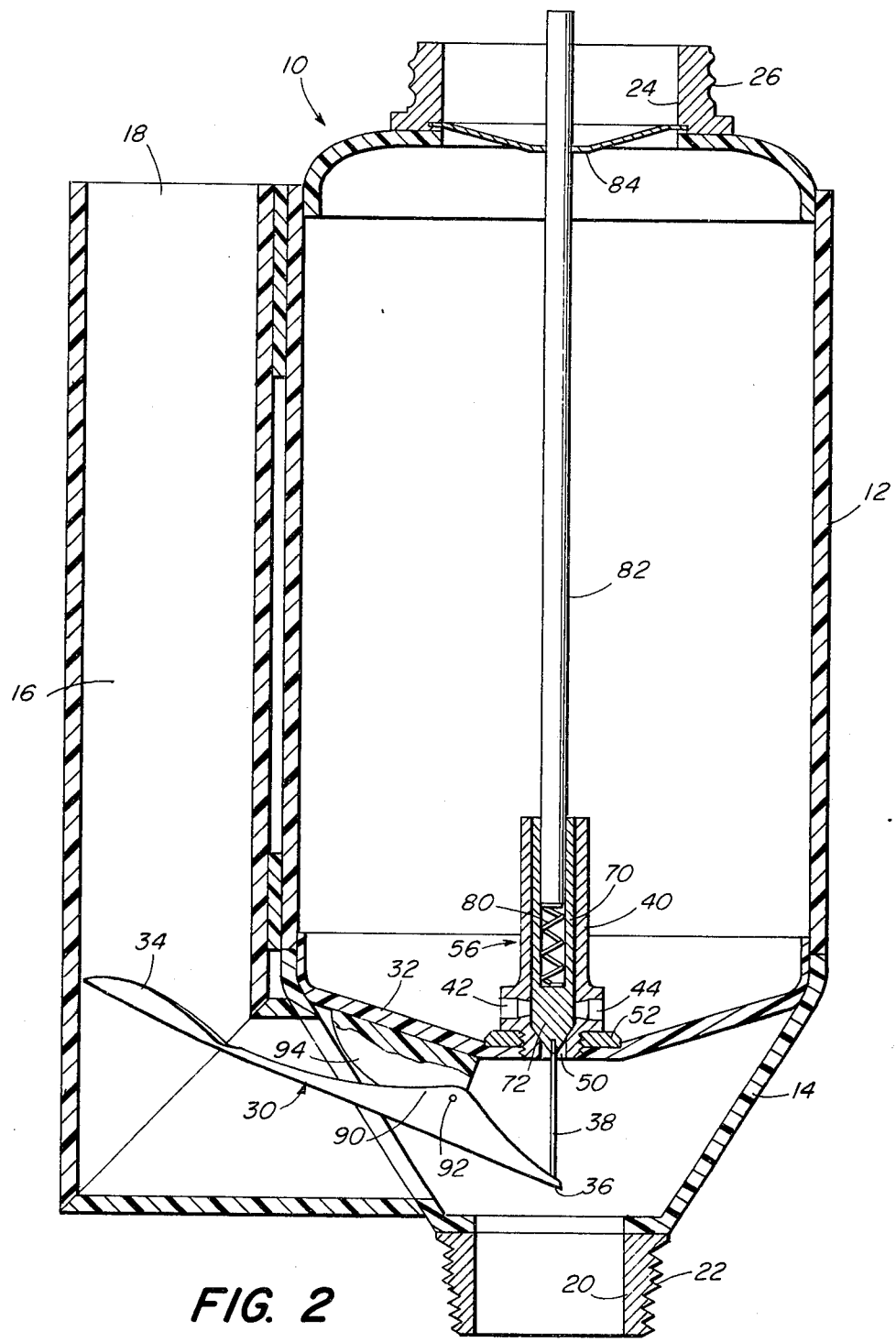
FIG. 2 is a cross-sectional view of the mixer of FIG. 1 primarily illustrating the operation of the inner spring-loaded piston valve mechanism of the present invention.

FIGS. 2 and 3, being a cross sectional view and an exploded view respectively, expose the operative members, especially spring-loaded piston 40, and the operating interrelations thereof. Piston 40 is situated within cylindrical lubricant container 12 and extends through aperture 50 concentrically located within lubricant container base 32. Base 32 is concentrically sloped at approximately fifteen degrees downwards from its outer extent to its inner extent to allow gravity to produce a more reliable constant flow of oil than if the base were planar. Situated upon container base 32 and within aperture 50 is a metallic washer-like retainer 52 having a hollow cylindrical base 54 which fits within and abuts aperture 50.

The interior of retainer 52 and cylindrical base 54 are threaded to accept a complimentary threaded metallic sleeve 56 which guides the vertical movement of piston 40. Sleeve 56 may have a machined flat polygonal sided base, which rests upon container base 32, with apertures 42 and 44 extending therethrough.

A primary purpose of sleeve 56 is to contain and guide valve needle 70 of spring-loaded piston valve 40. Valve needle 70 has a rounded conical base 72 from which protrudes thin needle pin 38 which extends downward to contact butterfly lever squared end 36. While in its rest position as illustrated in FIG. 2, conical valve needle conical base 72 will obstruct oil flow through apertures 42 and 44 within sleeve 56. Within the squared body 76 of valve needle 70 is an inner cylindrical aperture 78 which extends for substantially the entire length of the valve needle body and which allows provision for the seating of spring 80 and main piston shaft 82. Piston shaft 82 extends upwards to lubricant container neck 24 where it is guided and retained within an aperture of metallic retainer strip 84 which is appropriately secured to the inner surface of container neck 24.

As can be observed from FIG. 2 butterfly lever 30, between squared end 36 and contoured and curved end 34, has upwardly flanged sides 90. Flanged sides 90, at their widest extent, approximately one-third of the total lever length from squared end 36, are movably secured through opposing aperture 92 by a cotter key or other appropriate means, to a downward protruding L-shaped member 94 which is secured to the bottom surface of lubricant container base 32.

In operation, cover 28 is removed before fuel enters inlet pipe 16 and strikes and depresses contoured and curved spoon end 34 of butterfly lever 30. This causes butterfly lever squared end 36 to rise and push valve needle pin 38, resting upon it, upwards. Valve needle 70 rises slightly compressing spring 80 between main piston shaft 82. Spring 80 allows a small amount of fuel flow to receive a proportionately small lubricant flow due to the fact that valve needle 70 may move relatively freely and unobstructed for a very short distance depending upon the tension of spring 80. Upon a full fuel flow, whereby spring 80 is completely compressed, valve needle 70 and entire piston 40 will move unitarily to completely open sleeve apertures 64 and 66 to allow maximum lubricant flow into mixing chamber 14.

Due to the conical funnel shape of mixing chamber 14 a very acceptable mixing and agitation action occurs. Also due to the contour of butterfly lever spoon end 34 and flanged lever sides 90 a substantial amount of fuel will be directed into the path of the lubricant flow entering the mixing chamber to further facilitate the mixing and agitation action. The combined fluids thereafter exit through funnel neck base 20 of mixing chamber 14 into a fuel storage tank.

When not in use, cap 28 is secured to threaded ring 26 to close lubricant container 14. This forces shaft 82 downward such that conical valve needle base 72 will obstruct oil flow through aperatures 42 and 44 within sleeve 56. When cap 28 is removed, tension on spring-loaded piston valve 40, is lessened, but not sufficiently so to permit the flow of oil.

If only part of the gas is required, cap 28 may be replaced to close off the flow of oil. If, on the other hand, only oil is required cap 28 may be removed and shaft 82 manually pulled upward to permit the flow of oil through aperatures 42, 44 within sleeve 56. Spring-loaded piston valve 40 also compensates somewhat for differences in tolerances from one unit to another and for expansion and contraction of materials under varying temperature ranges.

Lubricant container 12 may be of any size but for ease of handling the container should only be able to contain one quart. The critical elements of the invention are the sizes of sleeve apertures 64 and 66 through which the lubricant flows to mixing chamber 14 to be proportionally mixed with the fuel and the tension of spring 80.

The inventor is aware that variations and changes may be made to the invention without departing from the spirit thereof and therefore wishes not to be strictly limited to the foregoing disclosure but only to be limited to the scope and spirit of the following claims.

I claim:

1. A fluid mixing device for the proportionate mixing of lubricant to fuel upon the addition of fuel to a fuel storage tank of a two cycle engine comprising:

a substantially cylindrical lubricant supply container;

a funnel-like mixing chamber immediately below said lubricant container;

a columnar fuel inlet pipe, secured to and abutting a surface of said lubricant container, perpendicularly angled at its base to merge with and direct fuel flow into said mixing chamber;

a butterfly lever, axially secured within said mixing chamber upon the bottom surface of the base of said lubricant container, having a contoured and curved spoon-like end extending within the base of the vertical portion of said fuel inlet pipe and an opposing squared end and flanged sides;

a concentric aperture within an inward and downwardly sloping surface of said base of said lubricant container;

a washer-like retainer member having a threaded hollow cylindrical base resting upon and extending though said base aperture;

a hollow metallic sleeve having a lower threaded portion to screwably mate with said threaded washer-like retainer and having opposing apertures near to upper extent of said threaded portion;

a needle valve member having a rounded conical base from which a thin needle pin extends downward and rests upon said butterfly lever squared end and having a rectangular upper body portion containing a hollowed cylindrical aperture for the majority of length thereof;

a spring within said cylindrical hollowed aperture of said needle valve member;

a main piston shaft having one end within said cylindrical hollowed needle valve aperture abutting said spring, said shaft extending to the neck of said lubricant container;

a metallic strip retainer having an aperture at its midpoint to slidably retain said shaft, said strip being secured to the inner surface of said neck.

2. The fluid mixing device of claim 1 wherein the inward and downward slope of said lubricant container base is approximately 15°.

3. The fluid mixing device of claim 1 wherein said butter-fly lever spoon-like contoured and curved end is upwardly and outwardly sloped and occupies substantially the entire diameter of the base of said inlet pipe and is capable of uninhibited vertical motion.

* * * * *